United States Patent
Dixon et al.

(10) Patent No.: US 8,214,598 B2
(45) Date of Patent: Jul. 3, 2012

(54) SYSTEM, METHOD, AND APPARATUS FOR A CACHE FLUSH OF A RANGE OF PAGES AND TLB INVALIDATION OF A RANGE OF ENTRIES

(75) Inventors: Martin G. Dixon, Portland, OR (US); Scott D. Rodgers, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 266 days.

(21) Appl. No.: 12/644,547

(22) Filed: Dec. 22, 2009

(65) Prior Publication Data

US 2011/0153952 A1    Jun. 23, 2011

(51) Int. Cl.
*G06F 13/00* (2006.01)
(52) U.S. Cl. ............... 711/135; 711/143; 711/E12.059
(58) Field of Classification Search .................. None
See application file for complete search history.

(56) References Cited

U.S. PATENT DOCUMENTS

| | | | | |
|---|---|---|---|---|
| 4,885,680 A * | 12/1989 | Anthony et al. | ............. | 711/144 |
| 6,978,357 B1 * | 12/2005 | Hacking et al. | ............. | 711/214 |
| 2002/0062525 A1 | 5/2002 | Karafa et al. | | |
| 2004/0059872 A1 | 3/2004 | Genduso et al. | | |
| 2006/0015683 A1 * | 1/2006 | Ashmore et al. | ............. | 711/113 |
| 2006/0143397 A1 | 6/2006 | O'Bleness et al. | | |
| 2008/0307165 A1 | 12/2008 | Kazuhiro | | |
| 2009/0216994 A1 * | 8/2009 | Hsieh et al. | ............. | 711/207 |

OTHER PUBLICATIONS

International Search Report and the Written Opinion from foreign counterpart Patent Cooperation Treaty Application No. PCT/US2010/058236 mailed Aug. 29, 2011, 9 pages.

* cited by examiner

*Primary Examiner* — Edward Cudek, Jr.
*Assistant Examiner* — Sean D Rossiter
(74) *Attorney, Agent, or Firm* — Blakely, Sokoloff, Taylor & Zafman LLP (57) ABSTRACT

Systems, methods, and apparatus for performing the flushing of a plurality of cache lines and/or the invalidation of a plurality of translation look-aside buffer (TLB) entries is described. In one such method, for flushing a plurality of cache lines of a processor a single instruction including a first field that indicates that the plurality of cache lines of the processor are to be flushed and in response to the single instruction, flushing the plurality of cache lines of the processor.

13 Claims, 12 Drawing Sheets

SYSTEM, METHOD, AND APPARATUS FOR A CACHE FLUSH OF A RANGE OF PAGES AND TLB INVALIDATION OF A RANGE OF ENTRIES

FIELD OF THE INVENTION

Embodiments of the invention relate generally to the field of information processing and, more specifically, to the field of cache and translation look-aside (TLB) maintenance.

BACKGROUND

A cache memory device is a small, fast memory that is available to contain the most frequently accessed data from a larger, slower memory. Random access memory (RAM) provides large amounts of storage capacity at a relatively low cost. Unfortunately, access to RAM is slow relative to the processing speed of modern microprocessors. Even though the storage capacity of the cache memory may be relatively small, it provides high-speed access to the data stored therein.

The cache is managed, in various ways, so that it stores the instruction, translation, or data most likely to be needed at a given time. When the cache is accessed and contains the requested data, a cache "hit" occurs. Otherwise, if the cache does not contain the requested data, a cache "miss" occurs. Thus, the cache contents are typically managed in an attempt to maximize the cache hit-to-miss ratio.

Devices and operating systems want to flush pages of data out of cache and entries out of TLBs as a part of a maintenance practice.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

A technique to flush the cache line may be associated with a linear or virtual memory address. Upon execution, the technique flushes the cache line associated with the operand from all caches in the coherency domain. In a multi-processor environment, for example, the specified cache line is flushed from all cache hierarchy levels in all microprocessors in the system (i.e. the coherency domain), depending on processor state. The MESI (Modified, Exclusive, Shared, Invalid) protocol, a write-invalidate protocol, gives every cache line one of four states which are managed by two MESI-bits. The four states also identify the four possible states of a cache line. If the processor is found in "exclusive" or "shared" states, the flushing equates to the cache line being invalidated. Another example is true when the processor is found in "modified" state. If a cache controller implements a write-back strategy and, with a cache hit, only writes data from the processor to its cache, the cache line content must be transferred to the main memory, and the cache line is invalidated. Additionally, some embodiments use the MESI and MOESI protocols as well as GOLS sub-protocols.

Exemplary Processor Core

Figure 1:
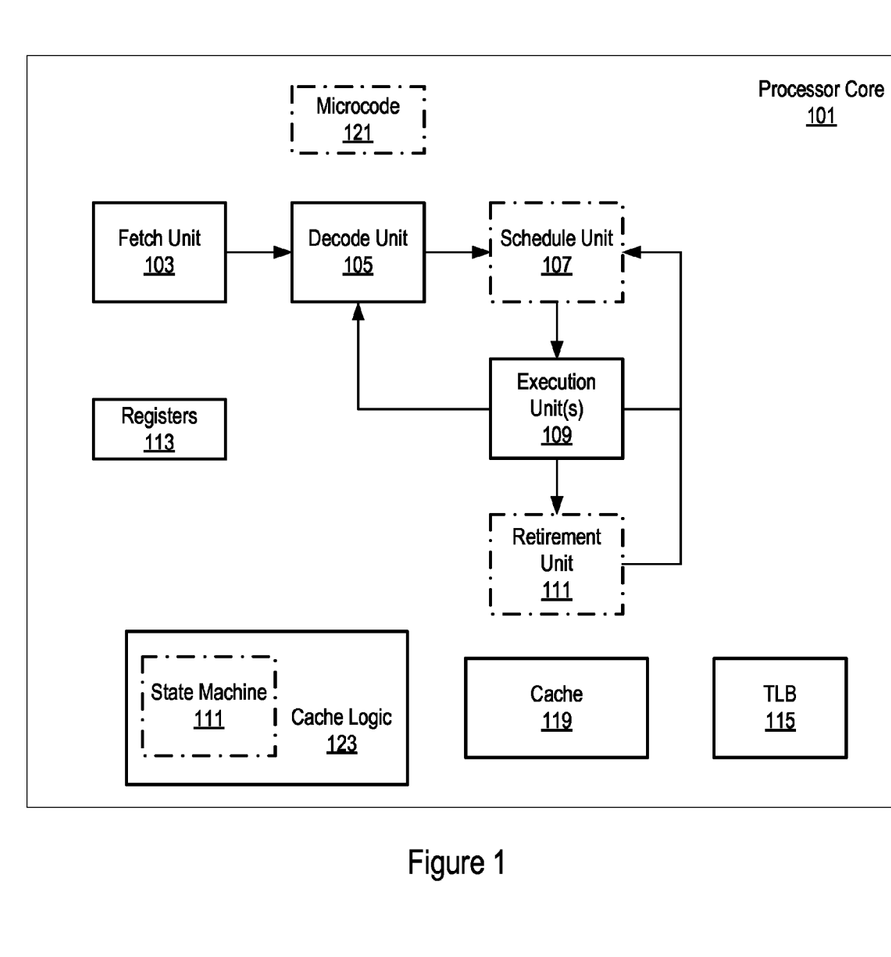
FIG. 1 describes an embodiment of a processor core that supports cache flushing of a range of cache lines and/or the invalidation of a range of TLB entries.

FIG. 1 describes an embodiment of a processor core that supports cache flushing of a range of cache lines and/or the invalidation of a range of TLB entries. This embodiment does not necessarily show all aspects that would be included in the processor core so as to not obscure the description of embodiments of the present invention. The processor core 101 includes a fetch unit 103 to fetch instructions for execution by the core 101. The instructions may be fetched from any storage devices such as cache, main memory, hard disk, etc. The processor core 101 also includes a decode unit 105 to decode the fetched instruction. The instructions described below are decoded by this unit. In an embodiment the decode unit 105 decodes a fetched instruction into one or more µops (micro-operations). The mapping of instructions to µops may be embodied in microcode logic 121.

In some embodiments, the processing core 101 includes a schedule unit 107. The schedule unit 107 performs various operations associated with storing decoded instructions (e.g., received from the decode unit 105) until the instructions are ready for dispatch, e.g., until all source values of a decoded instruction become available. In one embodiment, the schedule unit 105 schedules and/or issues (dispatches) decoded instructions to one or more execution units 109 for execution. The execution units 105 may include one or more of a floating point functional unit, an ALU functional unit, a memory functional unit, a branching functional unit, etc. These functional units execute decoded instructions (e.g., those instructions decoded by the decode unit 105) and/or dispatched (e.g., by the schedule unit 107). Further, in some embodiments, the execution units 109 execute instructions out-of-order. Hence, the processor core 101 is an out-of-order processor core in those embodiments. In other embodiments, the execution units 109 execute instructions in-order. In those embodiments, the processor core 101 is an in-order processor core.

The processor core 101 may also include a retirement unit 111. The retirement unit 111 retires executed instructions after they are committed. In some embodiments, retirement of the executed instructions results in processor state being committed from the execution of the instructions, physical registers used by the instructions being de-allocated, etc.

The processor core also includes register 113. These register may include typical x86 registers such as general (e.g., EAX, EBC, ECX, EDX), segment (e.g., CS, DS, ES, FS, GS, SS), index and pointer (e.g., ESI, EDI, EBP, EIP, ESP), and indicator registers (e.g., EFLAGS), etc.

The processor core 101 may also include a cache 119. This cache may include one or more levels. Cache logic 123 maintains the cache 119 by performing various operations. In some embodiments, the cache logic 123 includes one or more state machines for performing embodiments of the methods described later.

Finally, the processor may also include a translation lookaside buffer (TLB) 115. The TLB 115 has a fixed number of slots that contain page table entries, which map virtual addresses to physical addresses.

The above described units and logic may be any combination of circuitry and/or software.

Repeat Cache Line Flush

A cache line flush (CLFLUSH) instruction executed by the above described processor core invalidates a single cache line that contains the linear address specified with the source operand from all levels of the processor cache hierarchy (data and instruction). The invalidation is broadcast throughout the cache coherence domain. If, at any level of the cache hierarchy, the line is inconsistent with memory (dirty) it is written to memory before invalidation. The source operand is a byte memory location.

Figure 2:
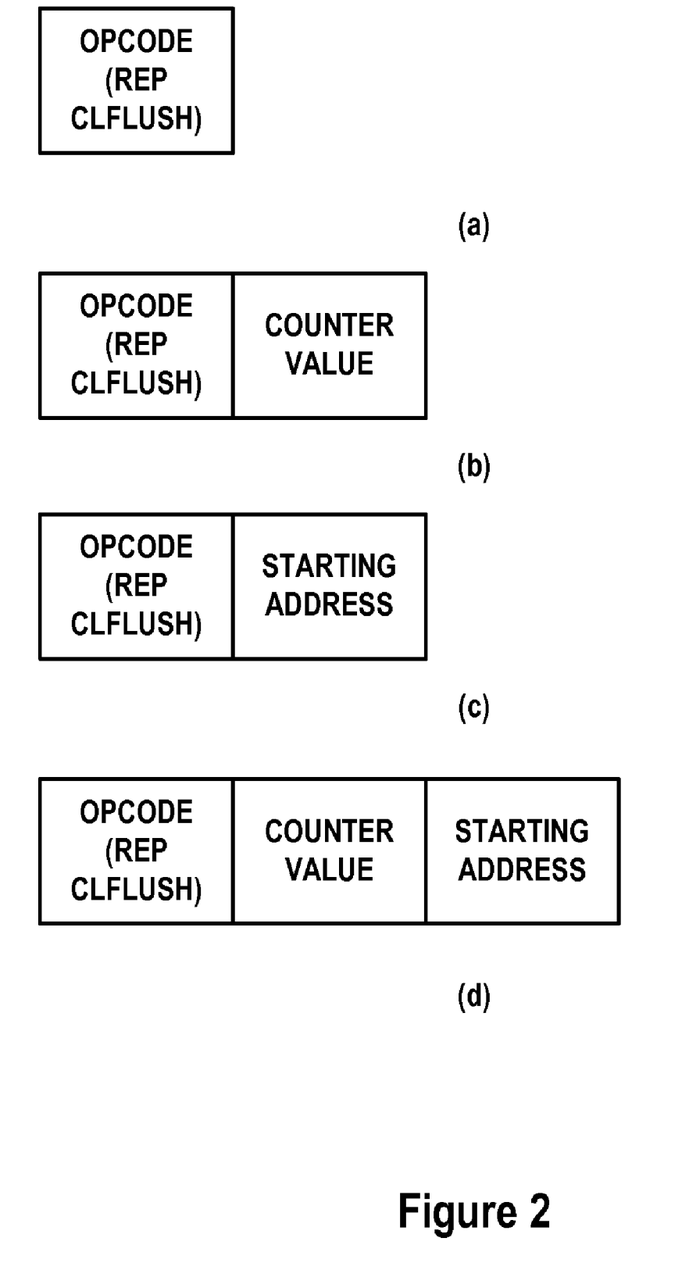
FIG. 2 illustrates several exemplary embodiments of a REP CLFLUSH instruction.

The CLFLUSH instruction may be used at all privilege levels and is subject to all permission checking and faults associated with a byte load except a CLFLUSH is allowed to an execute-only segment. A repeat cache line flush (REP CLFLUSH) instruction is described below. This instruction causes the processor core 101 to flush a range of cache lines. FIG. 2 illustrates several exemplary embodiments of a REP CLFLUSH instruction. FIG. 2(*a*) shows a REP CLFLUSH instruction with only an opcode. For this instruction, the number and at least the starting address of the lines to be flushed is implicitly referenced. For example, in some embodiments, the starting address is stored in a segment:offset pair such as a ES:ESI register pair and the counter (number of lines) in a general register such as an ECX register. Of course, these are merely examples and other registers or other instruction operands may be utilized.

FIG. 2(*b*) illustrates a REP CLFLUSH instruction that includes an opcode and an explicit counter value. In some embodiments, the counter value is an immediate value and in other embodiments it is stored in a register. For this instruction, the starting address of the lines to be flushed is implicitly referenced. For example, in some embodiments, the starting address is stored in a segment:offset pair such as a ES:ESI register pair. Of course, this is merely an example and any register may be utilized including, but not limited to: 1) any of the segment registers CS, DS, ES, FS, SS, and GS; 2) general purpose registers EAX (accumulator), EBX (base register), ECX (count register), EDX (data register), ESI (source index), EDI (destination index), EBP (base pointer), ESP (stack pointer); and combinations thereof.

FIG. 2(*c*) illustrates a REP CLFLUSH instruction that includes an opcode and an explicit starting address. For this instruction, the number of the lines to be flushed is implicitly referenced. For example, in some embodiments, the counter is stored in a general register such as an ECX register. Of course, this is merely an example and other registers may be utilized.

FIG. 2(*d*) illustrates a REP CLFLUSH instruction that includes an opcode, an explicit counter value, and an explicit starting address.

Figure 3:
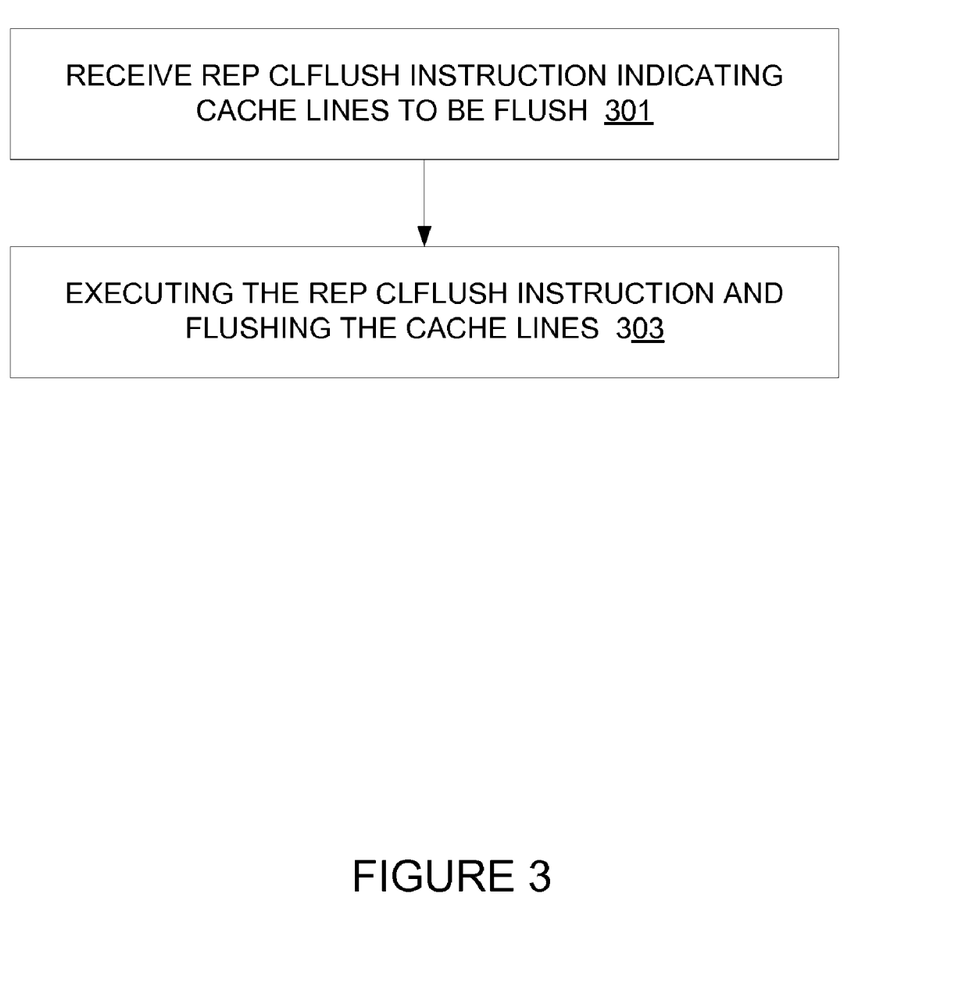
FIG. 3 is a block flow diagram of an embodiment of a method of processing an embodiment of a REP CLFLUSH instruction.

FIG. 3 is a block flow diagram of an embodiment of a method of processing an embodiment of a REP CLFLUSH instruction. In various embodiments, the method may be performed by a general-purpose processor, a special-purpose processor (e.g., a graphics processor or a digital signal processor), a hardware accelerator (e.g., a cryptographic accelerator), or another type of logic device or instruction processing apparatus.

The REP CLFLUSH instruction is received at the processor or other instruction processing apparatus at 301. In one or more embodiments, the REP CLFLUSH instruction indicates a starting cache line address and a value signifying the number of cache lines to flush. In some embodiments at least one of the starting cache line address and value signifying the number of cache lines to flush is explicitly included with the REP CLFLUSH instruction.

In response to receiving the instruction, the processor flushes the cache lines indicated by the REP CLFLUSH instruction at 303.

Figure 4:
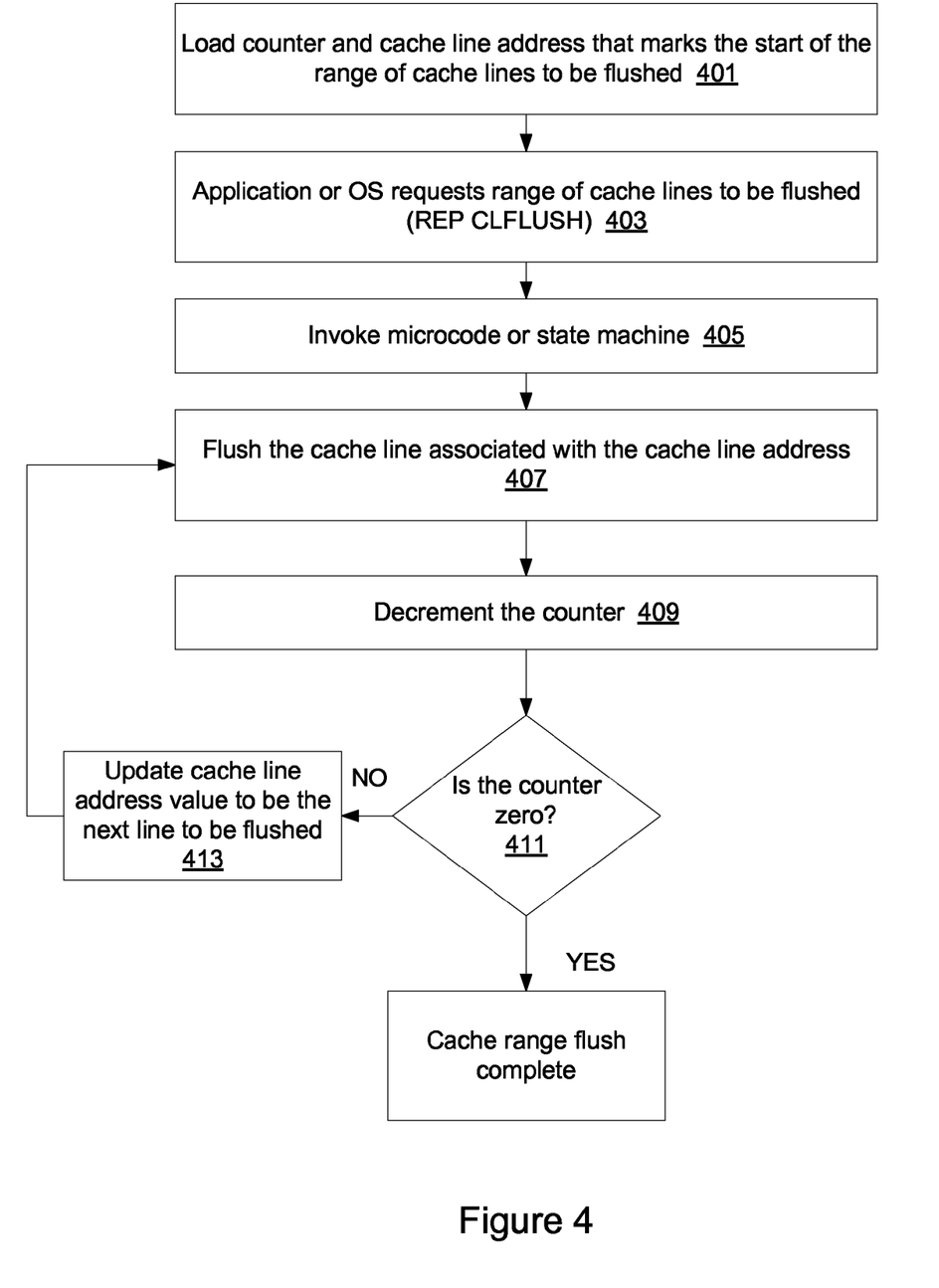
FIG. 4 illustrates embodiments of a REP CLFLUSH (repeat cache line flush) instruction execution.

FIG. 4 illustrates embodiments of a REP CLFLUSH (repeat cache line flush) instruction execution method. At 401, a counter value and cache line address is loaded. The counter value is set at the number of lines to be flushed. The cache line address marks that start of the range of cache lines to be flushed. For example, in some embodiments, the ES:ESI is loaded with the starting address and ECX is loaded with the counter value.

In other embodiments, where the REP CLFLUSH instruction includes explicit operands for a counter and/or addressing as discussed above the loading at 401 may be different. For example, if the REP CLFLUSH includes an immediate value for the counter, a register is not loaded with that counter value prior to the decoding of the REP CLFLUSH instruction.

At 403, an application or the operating system (OS) requests a range of cache lines to be flushed by calling for the execution of a REP CLFLUSH instruction. This instruction is at least fetched, decoded, and executed.

In some embodiments, microcode is invoked to translate this instruction into μops at 405. This μops are stored in microcode such as microcode 121. In other embodiments, a state machine is invoked at 405 to perform this instruction such as the state machine 111 of the cache logic 123. The execution of the instruction may be performed by the execution unit(s) 109 or cache logic 123 depending upon the processor core implementation.

The cache line associated with the cache line address (either loaded prior to the decoding of the REP CLFLUSH instruction or referenced in conjunction with that decoding) is flushed at 407. For example, the cache line at ES:ESI is flushed.

The counter value is decremented at 409. In an embodiment, this counter is stored in the ECX register and this register is decremented.

A determination of if the counter value is zero is made at 411. If the counter value is not zero, then the cache line address of the next line to be flushed is determined at 413. In some embodiments, this is done by adding a set size (e.g., 64 bits) to the previous cache line size to the address of the cache line that was just flushed. In other embodiments, a set size (e.g., 64 bits) is subtracted from the previous cache line size to the address of the cache line that was just flushed. That cache line is flushed at 407.

If the counter value is zero, then the entire cache line range as been flushed and the instruction may be retired.

While the above description decrements the counter value, in other embodiments a counter is increased and compared to a preset value to determine if the proper number of lines has been flushed.

Repeat Invalidate Page Table Entry

A invalidate TLB entry (INVLPG) instruction executed by the above described processor core invalidates a translation look-aside buffer (TLB) entry specified with the source operand. The source operand is a memory address. The processor core determines the page that contains that address and flushes the TLB entry for that page.

Figure 5:
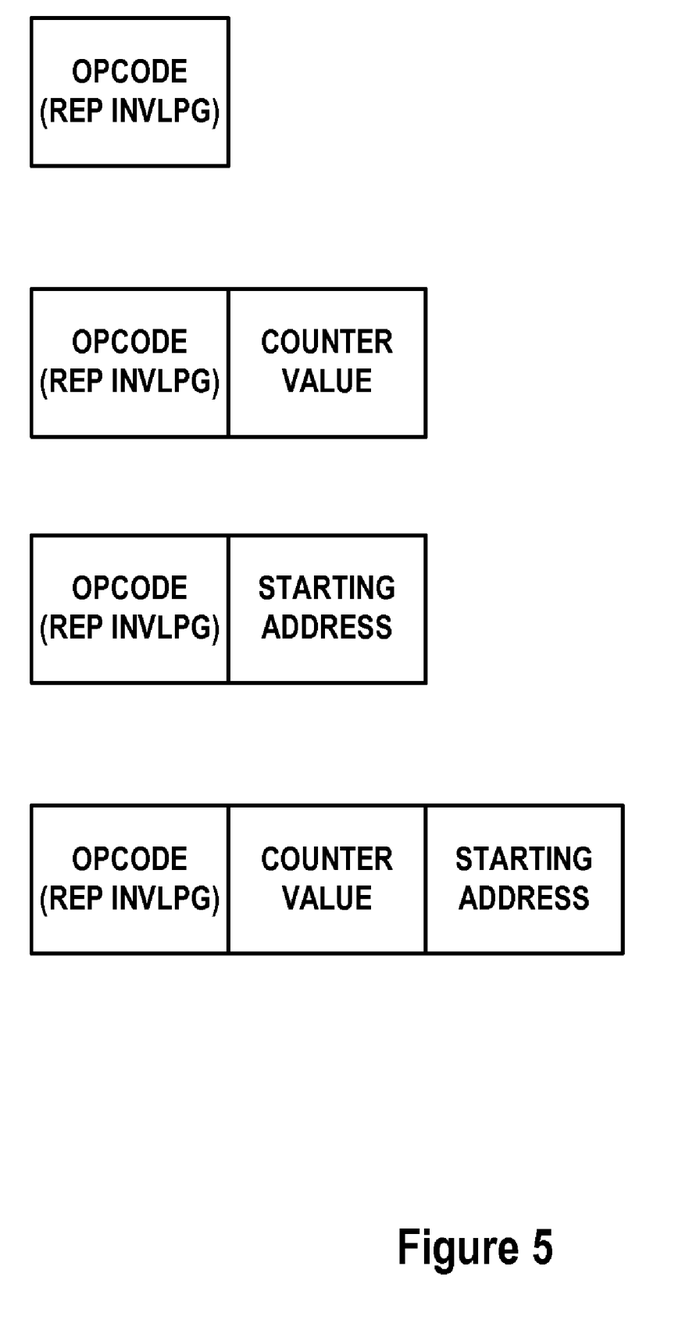
FIG. 5 illustrates several exemplary embodiments of a REP INVLPG instruction.

A repeat invalidate TLB entry (REP INVLPG) instruction is described below. This instruction causes the processor core 101 to invalidate multiple TLB entries. FIG. 5 illustrates several exemplary embodiments of a REP INVLPG instruction. FIG. 5(a) shows a REP INVLPG instruction with only an opcode. For this instruction, the number and at least the starting address of the TLB entries to be invalidated is implicitly referenced. For example, in some embodiments, the starting address is stored in a segment:offset pair such as a DS:EDI register pair and the counter (number of entries) in a general register such as an ECX register. Of course, this is merely an example and any register may be utilized including, but not limited to: 1) any of the segment registers CS, DS, ES, FS, SS, and GS; 2) general purpose registers EAX (accumulator), EBX (base register), ECX (count register), EDX (data register), ESI (source index), EDI (destination index), EBP (base pointer), ESP (stack pointer); and combinations thereof.

FIG. 5(b) illustrates a REP INVLPG instruction that includes an opcode and an explicit counter value. In some embodiments, the counter value is an immediate value and in other embodiments it is stored in a register. For this instruction, the starting address of the entries to be invalidated is implicitly referenced. For example, in some embodiments, the starting address is stored in a segment:offset pair such as a DS:EDI register pair. Of course, this is merely an example and other registers may be utilized.

FIG. 5(c) illustrates a REP INVLPG instruction that includes an opcode and an explicit starting address. For this instruction, the number of the entries to be invalidated is implicitly referenced. For example, in some embodiments, the counter is stored in a general register such as an ECX register. Of course, this is merely an example and other registers may be utilized.

FIG. 5(d) illustrates a REP INVLPG instruction that includes an opcode, an explicit counter value, and an explicit starting address.

FIG. 3 is a block flow diagram of an embodiment of a method of processing an embodiment of a REP INVLPG instruction. In various embodiments, the method may be performed by a general-purpose processor, a special-purpose processor (e.g., a graphics processor or a digital signal processor), a hardware accelerator (e.g., a cryptographic accelerator), or another type of logic device or instruction processing apparatus.

Figure 6:
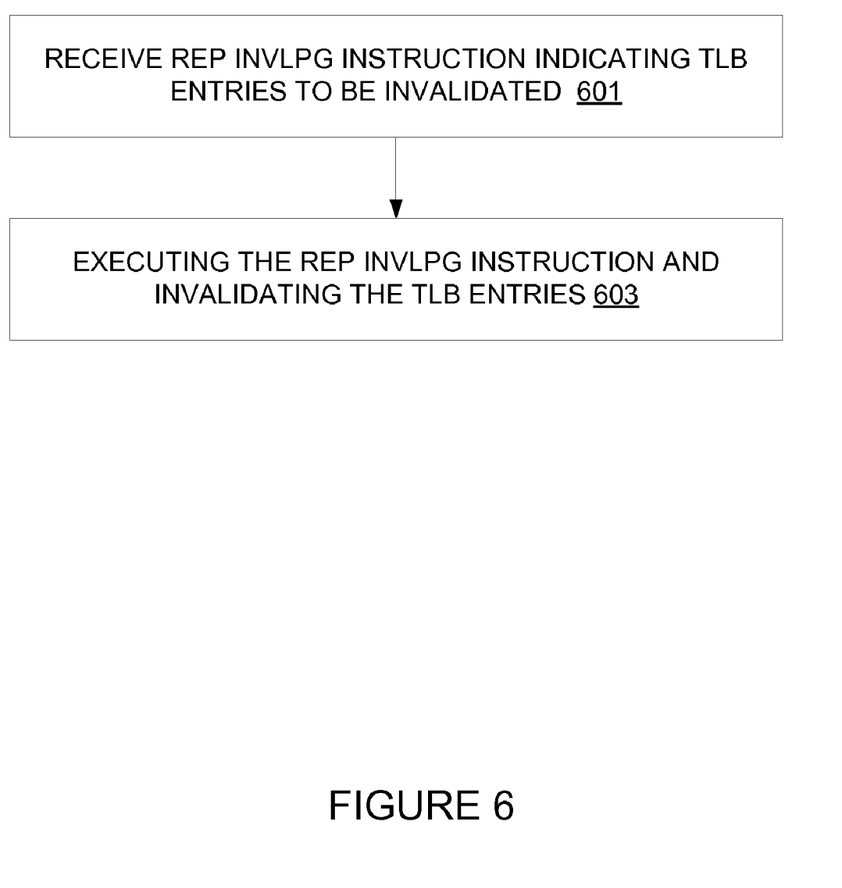
FIG. 6 is a block flow diagram of an embodiment of a method of processing an embodiment of a REP INVLPG instruction.

The REP INVLPG instruction is received at the processor or other instruction processing apparatus at 601. In one or more embodiments, the REP INVLPG instruction indicates a starting TLB entry address and a value signifying the number of TLB entries to invalidate. In some embodiments at least one of the starting TLB entry address and value signifying the number of TLB entries to invalidate is explicitly included with the REP INVLPG instruction.

In response to receiving the instruction, the processor invalidates the TLB entries indicated by the REP INVLPG instruction at 603.

Figure 7:
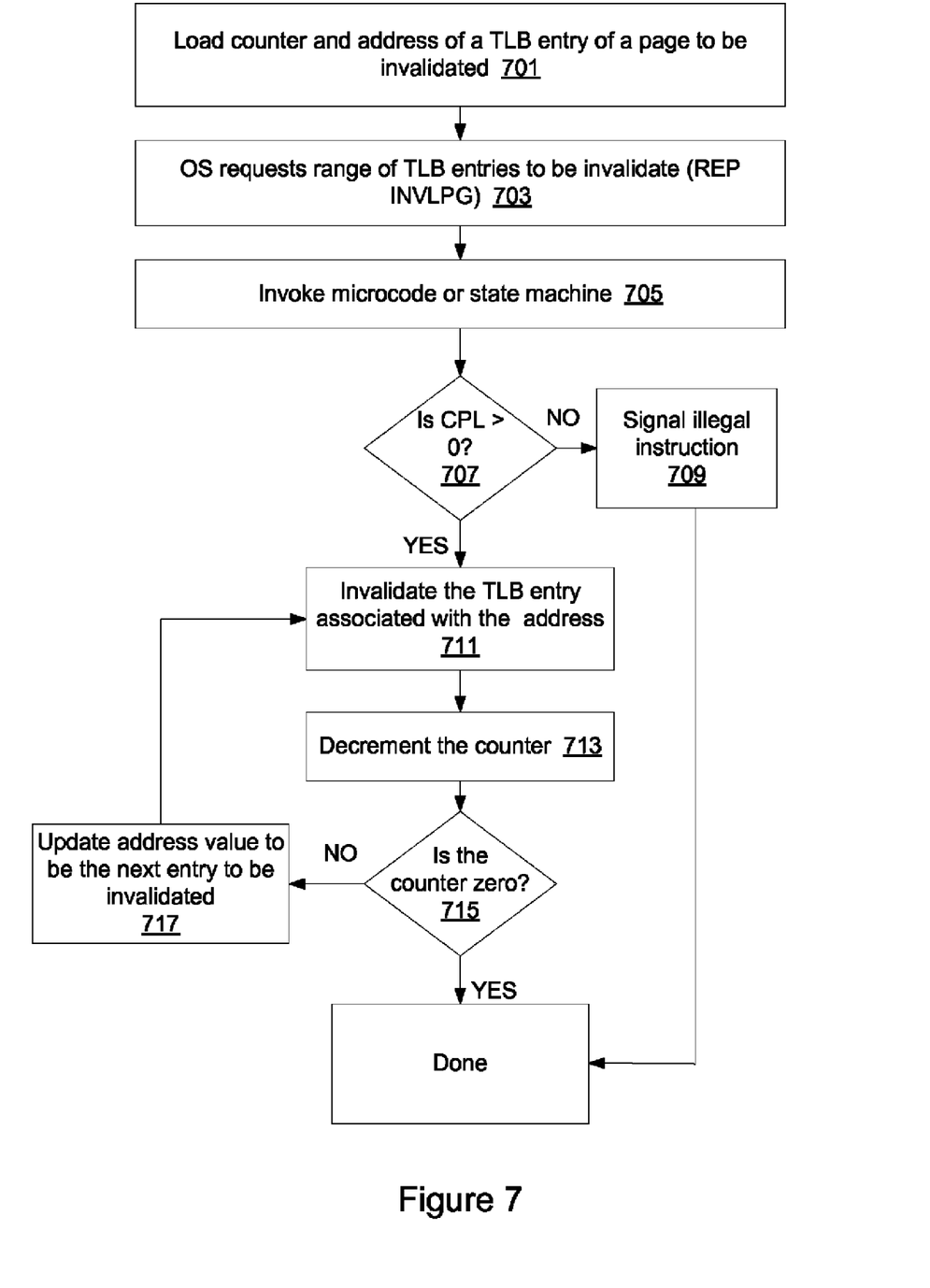
FIG. 7 illustrates embodiments of a REP INVLPG instruction execution.

FIG. 7 illustrates embodiments of a REP INVLPG instruction execution. At 701, a counter value and TLB entry address is loaded. The counter value is set at the number of entries to be invalidated. The address marks that start of the range of entries to be invalidated. For example, in some embodiments, the DS:EDI is loaded with the starting address and ECX is loaded with the counter value.

In other embodiments, where the REP INVLPG instruction includes explicit operands for a counter and/or addressing as discussed above the loading at 401 may be different. For example, if the REP INVLPG includes an immediate value for the counter, a register is not loaded with that counter value prior to the decoding of the REP INVLPG instruction.

At 703, the operating system (OS) requests a range of TLB entries to be invalidated by calling for the execution of a REP INVLPG instruction. This instruction is at least fetched, decoded, and executed.

In some embodiments, microcode is invoked to translate this instruction into µops at 705. This µops are stored in microcode such as microcode 121. In other embodiments, a state machine is invoked at 705 to perform this instruction such as a state machine of the TLB. The execution of the instruction may be performed by the execution unit(s) 109 or the TLB depending upon the processor core implementation.

In some embodiments, the REP INVLPG instruction is a privileged instruction. When the processor is running in protected mode, the CPL of a program or procedure must be 0 to execute this instruction. A determination of if the current privilege level (CPL) of the processor is made at 707 in those embodiments. If the CPL is not 0, then the REP INVLPG is signaled at illegal at 709 and no TLB entries are invalidated.

The TLB entry associated with the TLB entry address (either loaded prior to the decoding of the REP INVLPG instruction or referenced in conjunction with that decoding) is invalidated at 711. For example, the cache line at DS:EDI is flushed.

The counter value is decremented at 711. In an embodiment, this counter is stored in the ECX register and this register is decremented.

A determination of if the counter value is zero is made at 715. If the counter value is not zero, then the TLB entry to be invalidated is determined at 717. In some embodiments, this is done by adding a set page size (e.g., 4 k/2M/1 GBs) to the previous address of the TLB entry that was just invalidated. In other embodiments, a set page size (e.g., 4 k/2M/1 GBs) is subtracted from the previous address of the TLB entry that was just invalidated. That TLB entry is invalidated at 711.

If the counter value is zero, then the entire cache line range as been flushed and the instruction may be retired.

While the above description decrements the counter value, in other embodiments a counter is increased and compared to a preset value to determine if the proper number of entries has been invalidated.

Exemplary Systems

Figure 8:
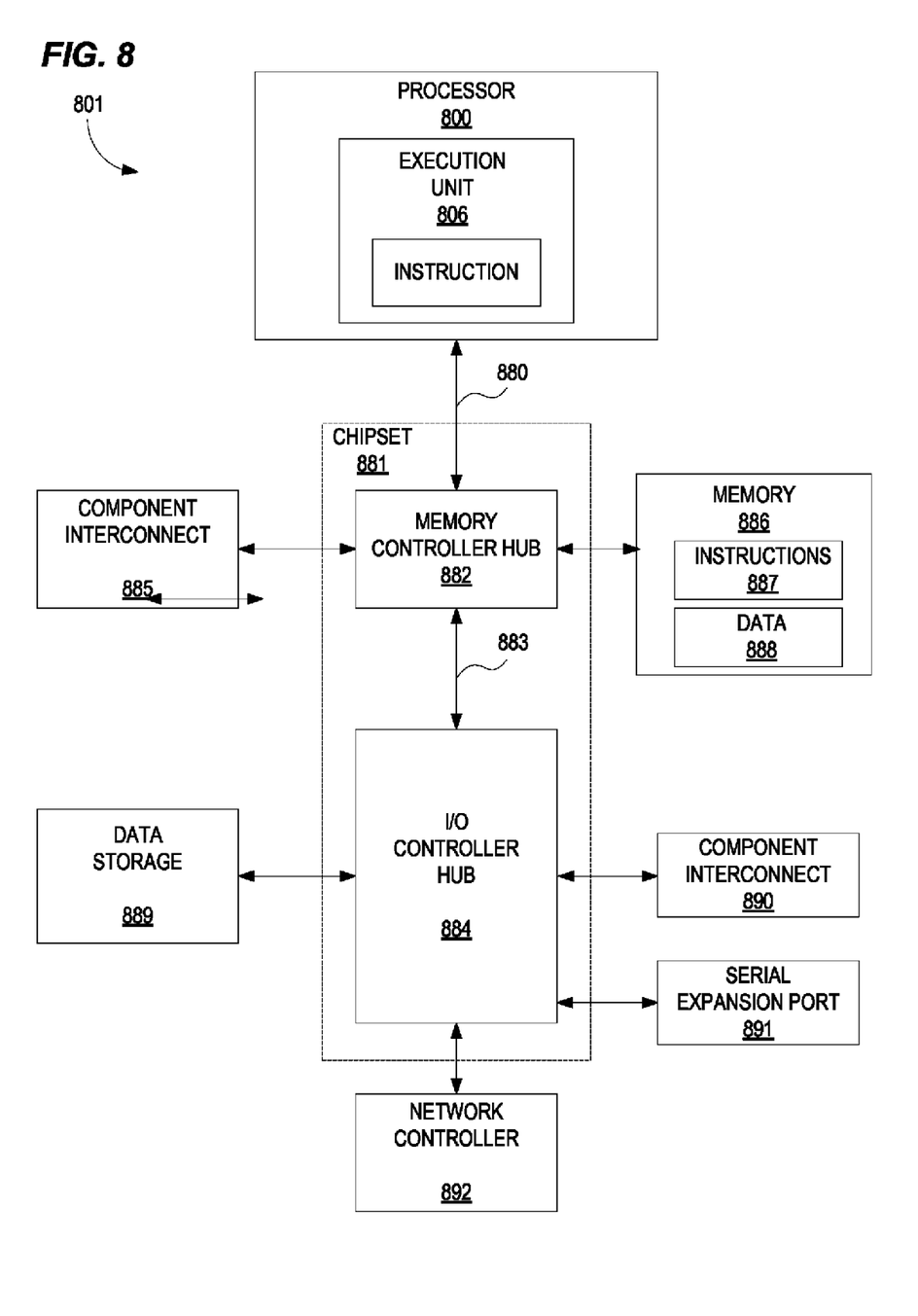
FIG. 8 is a block diagram of a example embodiment of a suitable computer system.

FIG. 8 is a block diagram of an example embodiment of a suitable computer system 801. The computer system includes a processor 800. The processor includes at least one execution unit 806 that is capable of executing at least one of the above described instructions 802.

The processor is coupled to a chipset 881 via a bus (e.g., a front side bus) or other interconnect 880. The interconnect may be used to transmit data signals between the processor and other components in the system via the chipset.

The chipset includes a system logic chip known as a memory controller hub (MCH) 882. The MCH is coupled to the front side bus or other interconnect 880.

A memory 886 is coupled to the MCH. In various embodiments, the memory may include a random access memory (RAM). DRAM is an example of a type of RAM used in some but not all computer systems. As shown, the memory may be used to store instructions 887, such as one or more multiply instructions, and data 888.

A component interconnect 885 is also coupled with the MCH. In one or more embodiments, the component interconnect may include one or more peripheral component interconnect express (PCIe) interfaces. The component interconnect may allow other components to be coupled to the rest of the system through the chipset. One example of such components is a graphics chip or other graphics device, although this is optional and not required.

The chipset also includes an input/output (I/O) controller hub (ICH) 884. The ICH is coupled to the MCH through hub interface bus or other interconnect 883. In one or more embodiments, the bus or other interconnect 883 may include a Direct Media Interface (DMI).

A data storage 889 is coupled to the ICH. In various embodiments, the data storage may include a hard disk drive, a floppy disk drive, a CD-ROM device, a flash memory device, or the like, or a combination thereof.

A second component interconnect 890 is also coupled with the ICH. In one or more embodiments, the second component interconnect may include one or more peripheral component interconnect express (PCIe) interfaces. The second component interconnect may allow various types of components to be coupled to the rest of the system through the chipset.

A serial expansion port 891 is also coupled with the ICH. In one or more embodiments, the serial expansion port may include one or more universal serial bus (USB) ports. The serial expansion port may allow various other types of input/output devices to be coupled to the rest of the system through the chipset.

A few illustrative examples of other components that may optionally be coupled with the ICH include, but are not limited to, an audio controller, a wireless transceiver, and a user input device (e.g., a keyboard, mouse).

A network controller is also coupled to the ICH. The network controller may allow the system to be coupled with a network.

In one or more embodiments, the computer system may execute a version of the WINDOWS™ operating system, available from Microsoft Corporation of Redmond, Wash. Alternatively, other operating systems, such as, for example, UNIX, Linux, or embedded systems, may be used.

This is just one particular example of a suitable computer system. For example, in one or more alternate embodiments, the processor may have multiple cores. As another example, in one or more alternate embodiments, the MCH 882 may be physically integrated on-die with the processor 800 and the processor may be directly coupled with a memory 886 through the integrated MCH. As a further example, in one or more alternate embodiments, other components may be integrated on-die with the processor, such as to provide a system-on-chip (SoC) design. As yet another example, in one or more alternate embodiments, the computer system may have multiple processors.

Figure 9:
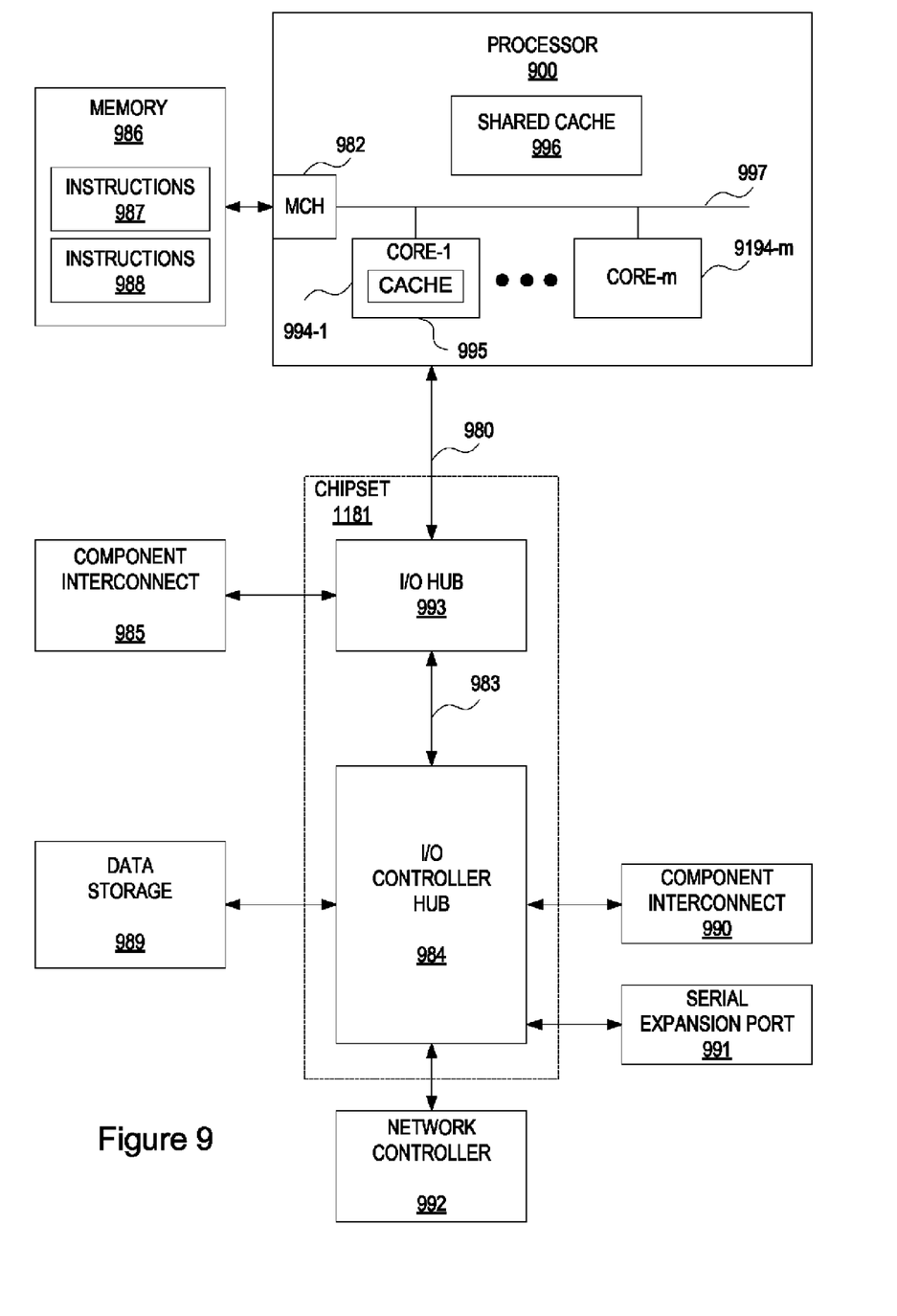
FIG. 9 is a block diagram of a example embodiment of a suitable computer system.

FIG. 9 is a block diagram of a example embodiment of a suitable computer system 901. The second example embodiment has certain similarities to the first example computer system described immediate above. For clarity, the discussion will tend to emphasize the differences without repeating all of the similarities.

Similar to the first example embodiment described above, the computer system includes a processor 900, and a chipset 981 having an I/O controller hub (ICH) 984. Also similarly to the first example embodiment, the computer system includes a first component interconnect 985 coupled with the chipset, a second component interconnect 990 coupled with the ICH, a serial expansion port 991 coupled with the ICH, a network controller 992 coupled with the ICH, and a data storage 989 coupled with the ICH.

In this second embodiment, the processor 900 is a multi-core processor. The multi-core processor includes processor cores 994-1 through 994-M, where M may be an integer number equal to or larger than two (e.g. two, four, seven, or more). Each core may include at least one execution unit that is capable of executing at least one embodiment of an instruction as disclosed herein. As shown, the core-1 includes a cache 995 (e.g., an L1 cache). Each of the other cores may similarly include a dedicated cache. The processor cores may be implemented on a single integrated circuit (IC) chip.

The processor also includes at least one shared cache 996. The shared cache may store data (e.g., instructions) that are utilized by one or more components of the processor, such as the cores. For example, the shared cache may locally cache data stored in a memory 986 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

The processor cores and the shared cache are each coupled with a bus or other interconnect 997. The bus or other interconnect may couple the cores and the shared cache and allow communication.

The processor also includes a memory controller hub (MCH) 982. As shown in this example embodiment, the MCH is integrated with the processor 900. For example, the MCH may be on-die with the processor cores. The processor is coupled with the memory 986 through the MCH. In one or more embodiments, the memory may include DRAM, although this is not required.

The chipset includes an input/output (I/O) hub 993. The I/O hub is coupled with the processor through a bus (e.g., a QuickPath Interconnect (QPI)) or other interconnect 980. The first component interconnect 985 is coupled with the I/O hub 993.

Figure 10:
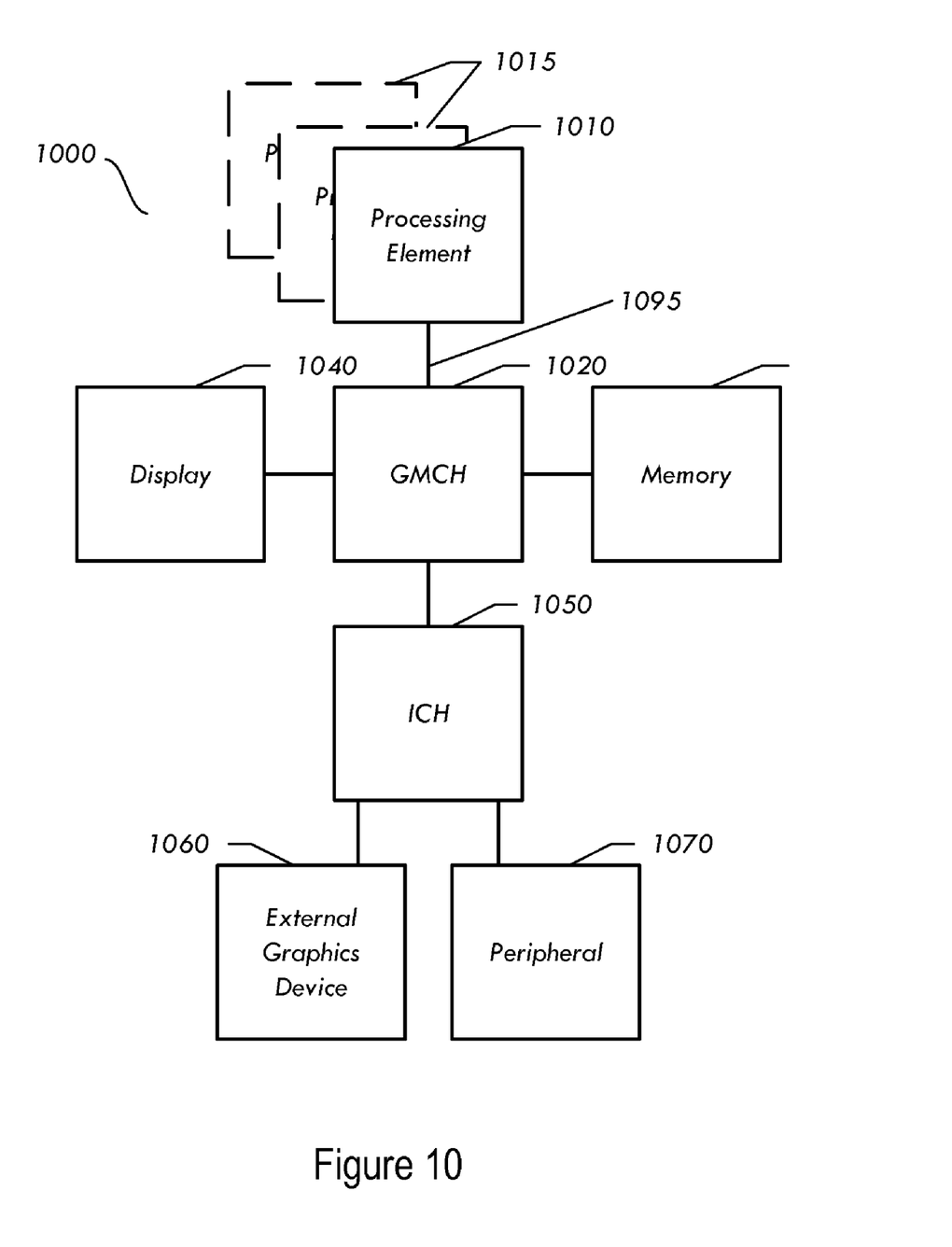
FIG. 10 is a block diagram of a system in accordance with one embodiment of the present invention

Referring now to FIG. 10, shown is a block diagram of a system 10 in accordance with one embodiment of the present invention. The system 1000 may include one or more processing elements 1010, 1015, which are coupled to graphics memory controller hub (GMCH) 1020. The optional nature of additional processing elements 1015 is denoted in FIG. 10 with broken lines.

Each processing element may be a single core or may, alternatively, include multiple cores. The processing elements may, optionally, include other on-die elements besides processing cores, such as integrated memory controller and/or integrated I/O control logic. Also, for at least one embodiment, the core(s) of the processing elements may be multi-threaded in that they may include more than one hardware thread context per core.

FIG. 10 illustrates that the GMCH 1020 may be coupled to a memory 1040 that may be, for example, a dynamic random access memory (DRAM). The DRAM may, for at least one embodiment, be associated with a non-volatile cache.

The GMCH 1020 may be a chipset, or a portion of a chipset. The GMCH 1020 may communicate with the processor(s) 1010, 1015 and control interaction between the processor(s) 1010, 1015 and memory 1040. The GMCH 1020 may also act as an accelerated bus interface between the processor(s) 1010, 1015 and other elements of the system 1000. For at least one embodiment, the GMCH 1020 communicates with the processor(s) 1010, 1015 via a multi-drop bus, such as a frontside bus (FSB) 1095.

Furthermore, GMCH 1020 is coupled to a display 1040 (such as a flat panel display). GMCH 1020 may include an integrated graphics accelerator. GMCH 1020 is further coupled to an input/output (I/O) controller hub (ICH) 1050, which may be used to couple various peripheral devices to system 1000. Shown for example in the embodiment of FIG. 10 is an external graphics device 1060, which may be a discrete graphics device coupled to ICH 1050, along with another peripheral device 1070.

Alternatively, additional or different processing elements may also be present in the system 1000. For example, additional processing element(s) 1015 may include additional processors(s) that are the same as processor 1010, additional processor(s) that are heterogeneous or asymmetric to processor 1010, accelerators (such as, e.g., graphics accelerators or digital signal processing (DSP) units), field programmable gate arrays, or any other processing element. There can be a variety of differences between the physical resources 1010, 1015 in terms of a spectrum of metrics of merit including architectural, microarchitectural, thermal, power consumption characteristics, and the like. These differences may effectively manifest themselves as asymmetry and heterogeneity amongst the processing elements 1010, 1015. For at least one embodiment, the various processing elements 1010, 1015 may reside in the same die package.

Figure 11:
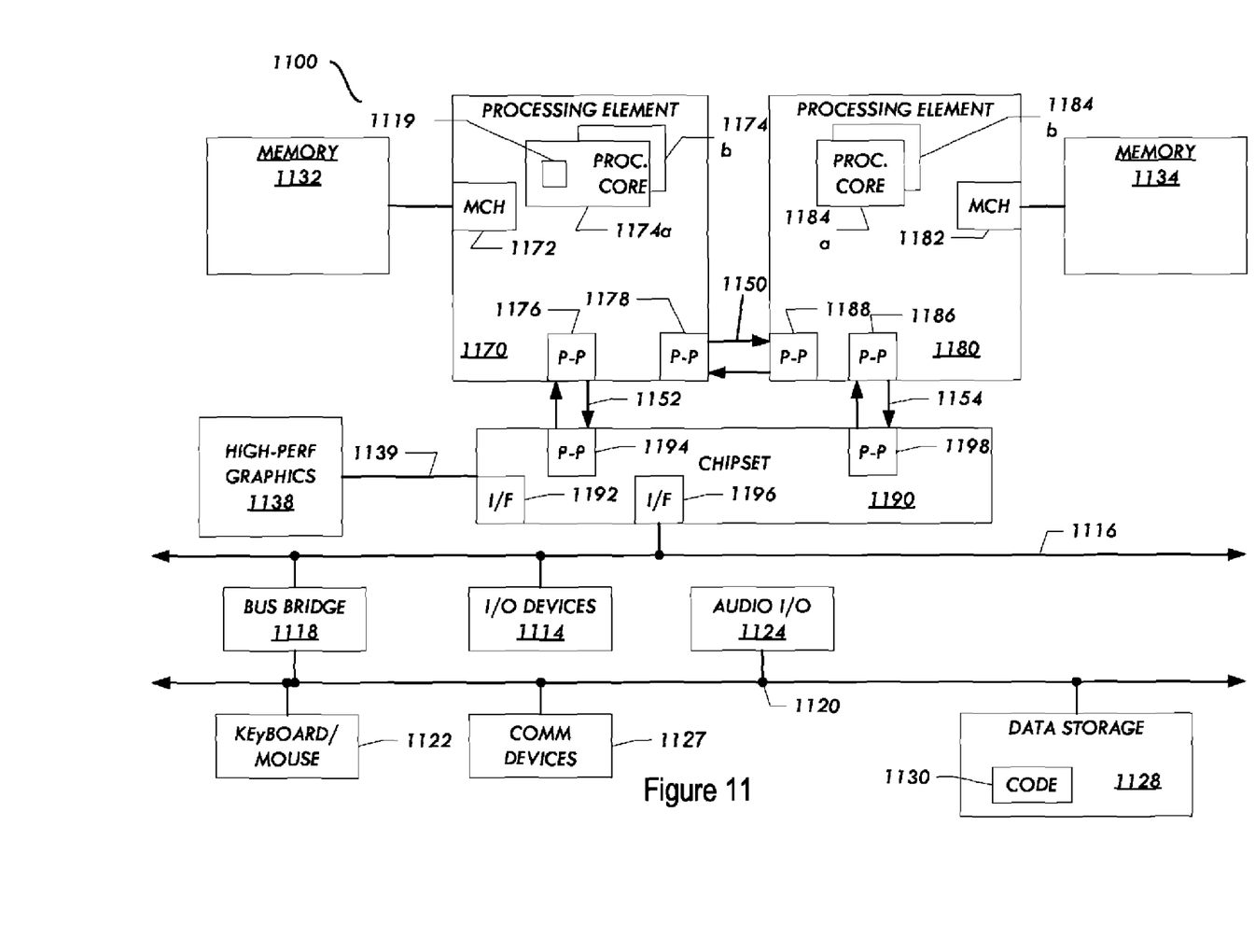
FIG. 11 is a block diagram of a system in accordance with an embodiment of the present invention.

Referring now to FIG. 11, shown is a block diagram of a system 1100 in accordance with an embodiment of the present invention. As shown in FIG. 11, multiprocessor system 1100 is a point-to-point interconnect system, and includes a first processing element 1170 and a second processing element 1180 coupled via a point-to-point interconnect 1150. As shown in FIG. 11, each of processing elements 1170 and 1180 may be multicore processors, including first and second processor cores (i.e., processor cores 1174a and 1174b and processor cores 1184a and 1184b).

Alternatively, one or more of processing elements 1170, 1180 may be an element other than a processor, such as an accelerator or a field programmable gate array.

While shown with only two processing elements 1170, 1180, it is to be understood that the scope of the present invention is not so limited. In other embodiments, one or more additional processing elements may be present in a given processor.

First processing element 1170 may further include a memory controller hub (MCH) 1172 and point-to-point (P-P) interfaces 1176 and 1178. Similarly, second processing element 1180 may include a MCH 1182 and P-P interfaces 1186 and 1188. Processors 1170, 1180 may exchange data via a point-to-point (PtP) interface 1150 using PtP interface circuits 1178, 1188. As shown in FIG. 11, MCH's 1172 and 1182 couple the processors to respective memories, namely a memory 1142 and a memory 1144, which may be portions of main memory locally attached to the respective processors.

Processors 1170, 1180 may each exchange data with a chipset 1190 via individual PtP interfaces 1152, 1154 using point to point interface circuits 1176, 1194, 1186, 1198. Chipset 1190 may also exchange data with a high-performance graphics circuit 1138 via a high-performance graphics interface 1139. Embodiments of the invention may be located within any processor having any number of processing cores, or within each of the PtP bus agents of FIG. 11. In one embodiment, any processor core may include or otherwise be associated with a local cache memory (not shown). Furthermore, a shared cache (not shown) may be included in either processor outside of both processors, yet connected with the processors via p2p interconnect, such that either or both processors' local cache information may be stored in the shared cache if a processor is placed into a low power mode.

First processing element 1170 and second processing element 1180 may be coupled to a chipset 1190 via P-P interconnects 1176, 1186 and 1184, respectively. As shown in FIG. 11, chipset 1190 includes P-P interfaces 1194 and 1198. Furthermore, chipset 1190 includes an interface 1192 to couple chipset 1190 with a high performance graphics engine 1148. In one embodiment, bus 1149 may be used to couple graphics engine 1148 to chipset 1190. Alternately, a point-to-point interconnect 1149 may couple these components.

In turn, chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present invention is not so limited.

As shown in FIG. 11, various I/O devices 1114 may be coupled to first bus 1116, along with a bus bridge 1118 which couples first bus 1116 to a second bus 1120. In one embodiment, second bus 1120 may be a low pin count (LPC) bus. Various devices may be coupled to second bus 1120 including, for example, a keyboard/mouse 1122, communication devices 1126 and a data storage unit 1128 such as a disk drive or other mass storage device which may include code 1130, in one embodiment. Further, an audio I/O 1124 may be coupled to second bus 1120. Note that other architectures are possible. For example, instead of the point-to-point architecture of FIG. 11, a system may implement a multi-drop bus or other such architecture.

Figure 12:
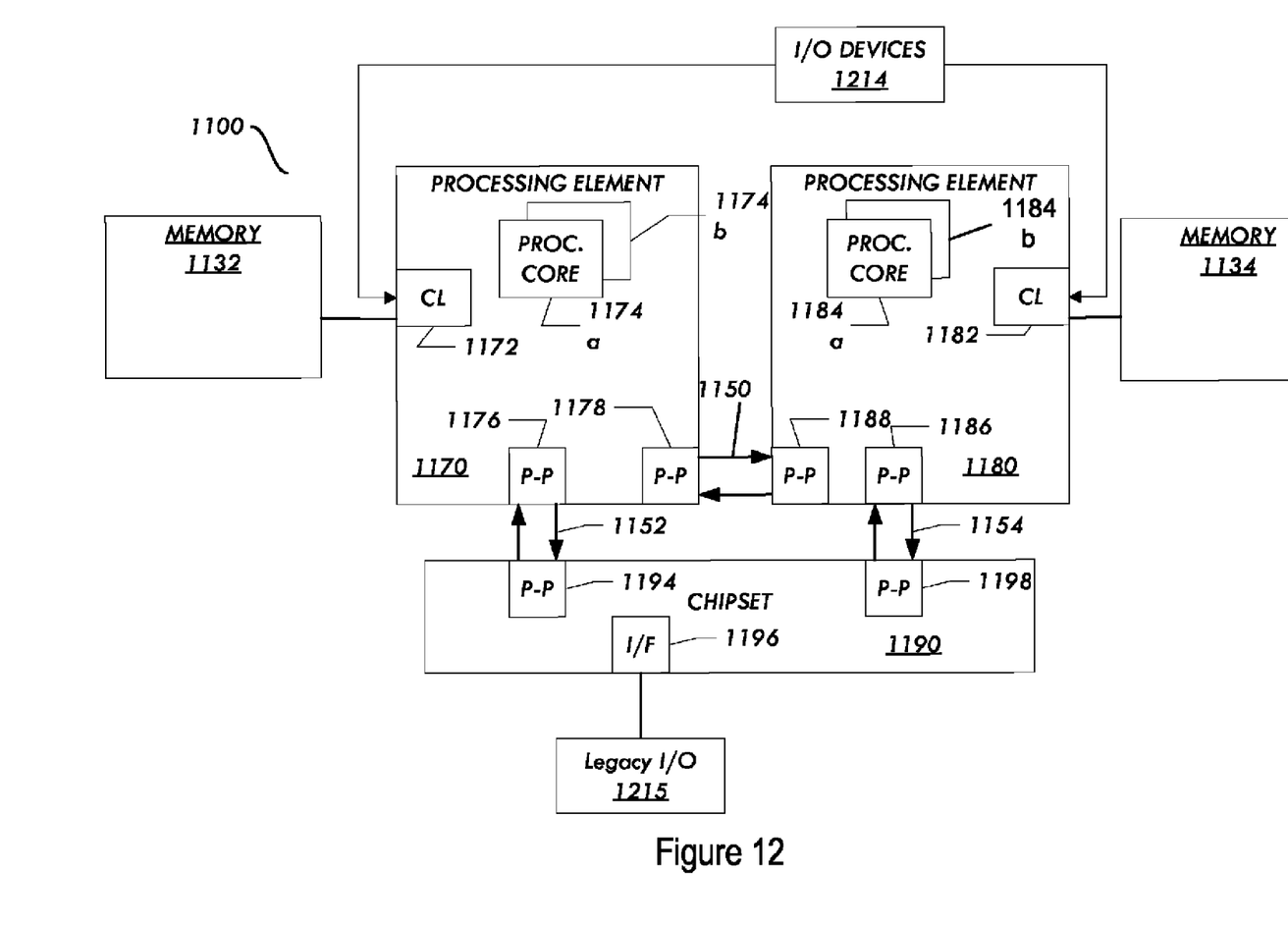
FIG. 12 is a block diagram of a system in accordance with an embodiment of the present invention.

Referring now to FIG. 12, shown is a block diagram of a system 1200 in accordance with an embodiment of the present invention. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processing elements 1170, 1180 may include integrated memory and I/O control logic ("CL") 1172 and 1182, respectively. For at least one embodiment, the CL 1172, 1182 may include memory controller hub logic (MCH) such as that described above in connection with FIGS. 10 and 11. In addition. CL 1172, 1182 may also include I/O control logic. FIG. 12 illustrates that not only are the memories 1142, 1144 coupled to the CL 1172, 1182, but also that I/O devices 1214 are also coupled to the control logic 1172, 1182. Legacy I/O devices 1215 are coupled to the chipset 1190.

Embodiments of the mechanisms disclosed herein may be implemented in hardware, software, firmware, or a combination of such implementation approaches. Embodiments of the invention may be implemented as computer programs executing on programmable systems comprising at least one processor, a data storage system (including volatile and non-volatile memory and/or storage elements), at least one input device, and at least one output device.

Program code, such as code 1130 illustrated in FIG. 11, may be applied to input data to perform the functions described herein and generate output information. Accordingly, embodiments of the invention also include machine-readable media containing instructions for performing the operations embodiments of the invention or containing design data, such as HDL, which defines structures, circuits, apparatuses, processors and/or system features described herein. Such embodiments may also be referred to as program products.

Such machine-readable storage media may include, without limitation, tangible arrangements of particles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the mechanisms described herein are not limited in scope to any particular programming language. In any case, the language may be a compiled or interpreted language.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Certain operations may be performed by hardware components, or may be embodied in machine-executable instructions, that may be used to cause, or at least result in, a circuit or hardware programmed with the instructions performing the operations. The circuit may include a general-purpose or special-purpose processor, or logic circuit, to name just a few examples. The operations may also optionally be performed by a combination of hardware and software. An execution unit and/or a processor may include specific or particular circuitry or other logic responsive to a machine instruction or one or more control signals derived from the machine instruction to store an instruction specified result operand.]

This is just one particular example of a suitable system. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or an execution unit as disclosed herein are generally suitable.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate embodiments of the invention. The scope of the invention is not to be determined by the specific examples provided above but only by the claims below. In other instances, well-known circuits, structures, devices, and operations have been shown in block diagram form or without detail in order to avoid obscuring the understanding of the description. Where considered appropriate, reference numerals or terminal portions of reference numerals have been repeated among the figures to indicate corresponding or analogous elements, which may optionally have similar characteristics.

We claim:

1. A method for flushing a plurality of cache lines of a processor comprising:
   receiving a single instruction including a first field that indicates that the plurality of cache lines of the processor are to be flushed, wherein the single instruction implicitly provides a starting address of the cache lines to be flushed;
   in response to the single instruction, flushing the plurality of cache lines of the processor by,
   loading a first register with at least a portion of the starting address of the cache lines to be flushed,
   loading a second register with a counter value that represents a number of cache lines to be flushed,
   flushing a first cache line associated with the starting address of the cache lines to be flushed,
   decrementing the counter value stored in the second register,
   updating the first register to contain a least a portion of a next address of a second cache line to be flushed, and
   flushing the second cache line.

2. The method of claim 1, wherein updating the first register to contain a least a portion of a second address of a second cache line to be flushed comprises: adding a number to the starting address.

3. The method of claim 1, wherein updating the first register to contain a least a portion of a second address of a second cache line to be flushed comprises: subtracting a number from the starting address.

4. The method of claim 1, wherein an operating system (OS) requests execution of the single instruction.

5. A method for invalidating a plurality of translation lookaside buffer (TLB) entries comprising:
   receiving a single instruction including a first field that indicates that the plurality of TLB entries are to be invalidated, wherein the single instruction implicitly provides a starting address of a first TLB entry to be invalidated; and
   in response to the single instruction, invalidating the plurality of TLB entries by,
   loading a first register with at least a portion of the starting address of the TLB entries to be invalidated,
   loading a second register with a counter value that represents a number of TLB entries to be invalidated,
   invalidating a first TLB entry associated with the starting address of the TLB entries to be invalidated,
   decrementing the counter value stored in the second register,
   updating the first register to contain a least a portion of a second address of a second TLB entry to be invalidated, and
   invalidating the second TLB entry.

6. The method of claim 5, wherein updating the first register to contain a least a portion of a second address of a second TLB entry to be invalidated comprises: adding a number to the starting address.

7. The method of claim 5, wherein updating the first register to contain a least a portion of a second address of a second TLB entry to be invalidated comprises:
   subtracting a number from the starting address.

8. The method of claim 5, wherein an operating system (OS) requests execution of the single instruction.

9. An apparatus comprising:
a cache to store data as cache lines;
decode circuitry to decode a first instruction, wherein the first instruction includes a first field indicating that a plurality of cache lines of the cache are to be flushed; and
a first register to value representing the number of cache lines to be flushed in response to the execution of the first instruction;
a second register to store at least a portion of address of the first cache line to be flushed in response to the execution of the first instruction;
execution circuitry to flush the plurality of cache lines indicated by the decoded first instruction, by decrementing the value representing the number of cache lines to be flushed stored in the first register, updating the at least a portion of address to be flushed in the second register to contain a least a portion of a next address of a second cache line to be flushed, and flushing the second cache line.

10. The apparatus of claim 9, further comprising:
a translation look-aside buffer (TLB) to store page table entries, wherein the decode circuitry to decode a second instruction, wherein the second instruction includes a first field indicating that a plurality of TLB page table entries are to be invalidated.

11. The apparatus of claim 10, further comprising:
execution circuitry in the TLB to invalidate the plurality of TLB page table entries indicated by the second instruction.

12. The apparatus of claim 9, wherein the execution circuitry comprises:
a state machine representing a method for flushing the plurality of cache lines indicated by a decoded first instruction, wherein the state machine is stored in a cache logic.

13. The apparatus of claim 9, further comprising:
microcode to translate the first instruction into a plurality of microoperations to be performed by the execution circuitry.

* * * * *